US010178831B2

(12) United States Patent
Kelderman

(10) Patent No.: US 10,178,831 B2
(45) Date of Patent: Jan. 15, 2019

(54) BALE STACKER

(71) Applicant: Gary L. Kelderman, Oskaloosa, IA (US)

(72) Inventor: Gary L. Kelderman, Oskaloosa, IA (US)

(*) Notice: Subject to any disclaimer, the term of this patent is extended or adjusted under 35 U.S.C. 154(b) by 0 days.

(21) Appl. No.: 15/664,083

(22) Filed: Jul. 31, 2017

(65) Prior Publication Data
US 2017/0325404 A1 Nov. 16, 2017

Related U.S. Application Data

(62) Division of application No. 14/795,250, filed on Jul. 9, 2015, now Pat. No. 9,743,589.

(60) Provisional application No. 62/043,243, filed on Aug. 28, 2014.

(51) Int. Cl.
A01D 85/00 (2006.01)
A01F 15/08 (2006.01)

(52) U.S. Cl.
CPC ......... *A01D 85/005* (2013.01); *A01D 85/001* (2013.01); *A01D 2085/007* (2013.01)

(58) Field of Classification Search
CPC ........... A01D 85/005; A01D 2085/007; A01D 90/08; A01D 2085/008; A01D 85/002; A01D 87/12; A01F 15/0875
USPC .............. 187/253; 414/111, 24.5, 24.6, 495, 414/789.7, 795.3; 56/10.2 F, 14.9, 15.4, 56/341, 473.5
See application file for complete search history.

(56) References Cited

U.S. PATENT DOCUMENTS 2,792,950 A * 5/1957 Fenton ................. B65G 57/302
414/795.3
3,159,287 A * 12/1964 Stroup ................. A01D 85/005
414/111

FOREIGN PATENT DOCUMENTS

DE  19600325 A1 * 7/1997 ........... A01D 85/005
EP  1222850 A1 * 7/2002 ........... A01D 85/002
FR  2460602 A1 * 1/1981 ........... A01D 85/002

* cited by examiner

Primary Examiner — Gregory W Adams

(57) ABSTRACT

A method of and apparatus for producing stacks of large square bales. Bales are received from the baler via a bale accumulator and formed into a stack, a plurality of bales high. The resulting bale stacks may be dropped in the field for pickup later.

18 Claims, 9 Drawing Sheets

Fig. 4a
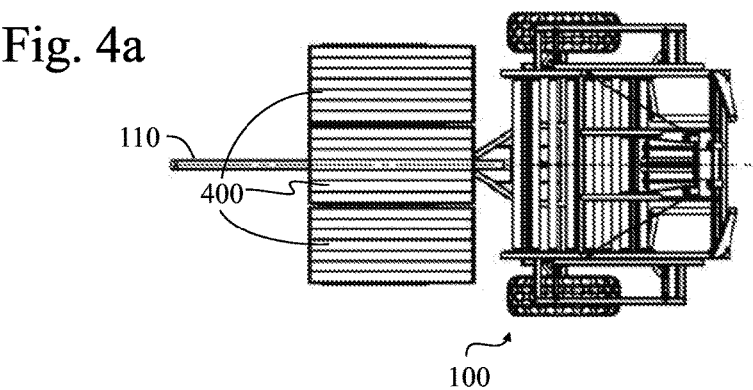
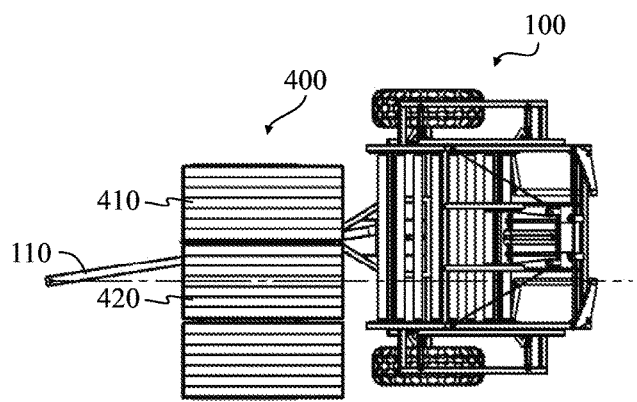
Fig. 4b
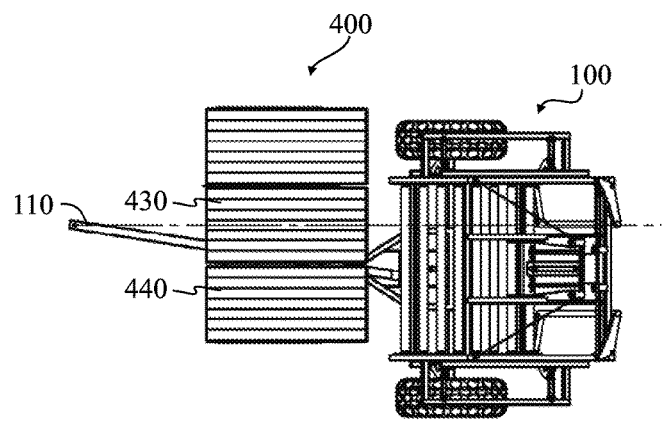
Fig. 4c

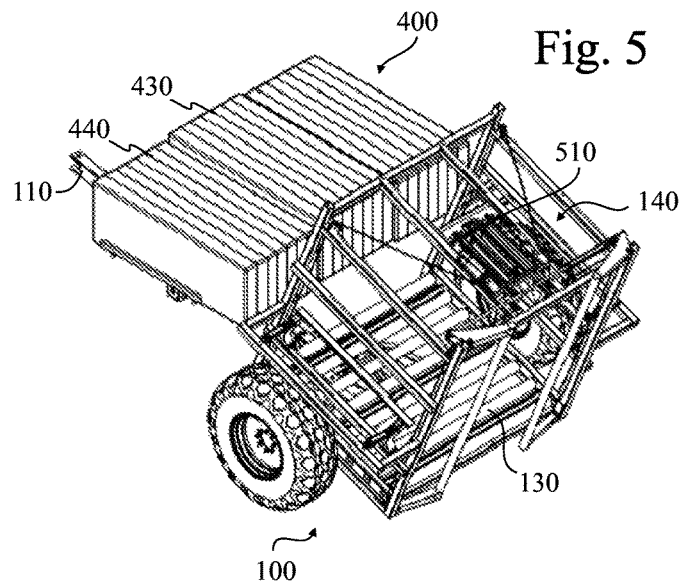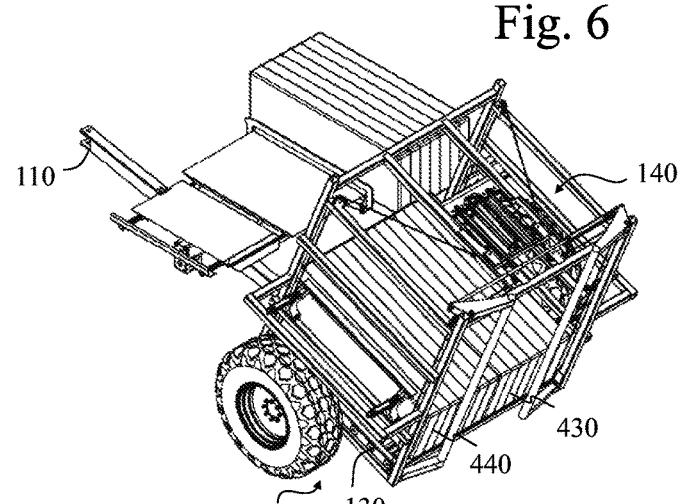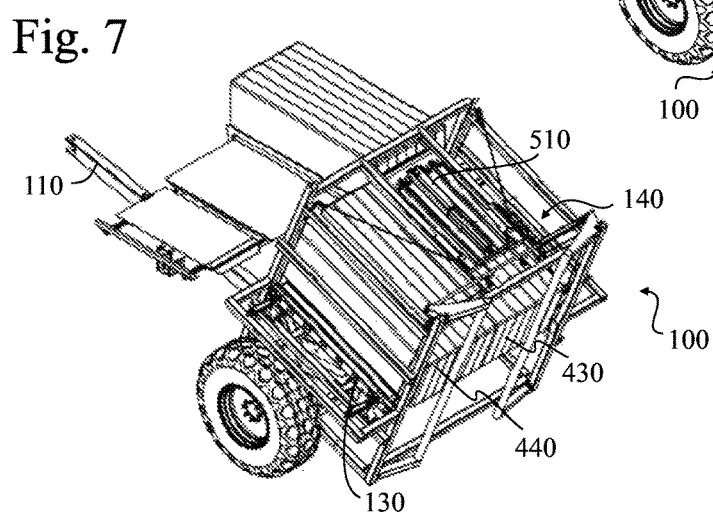

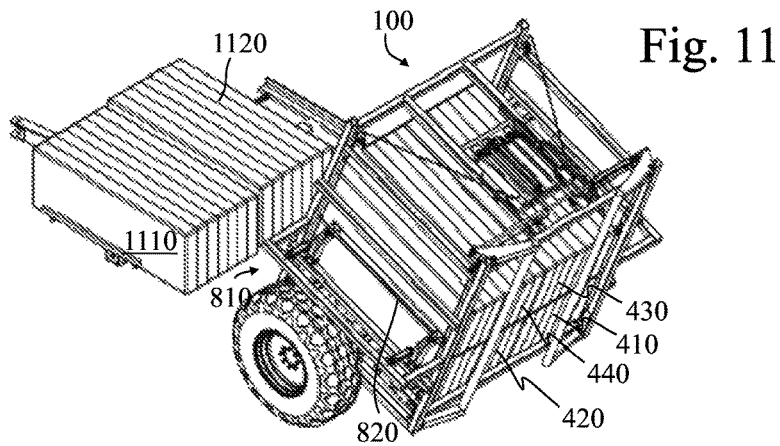
Fig. 11
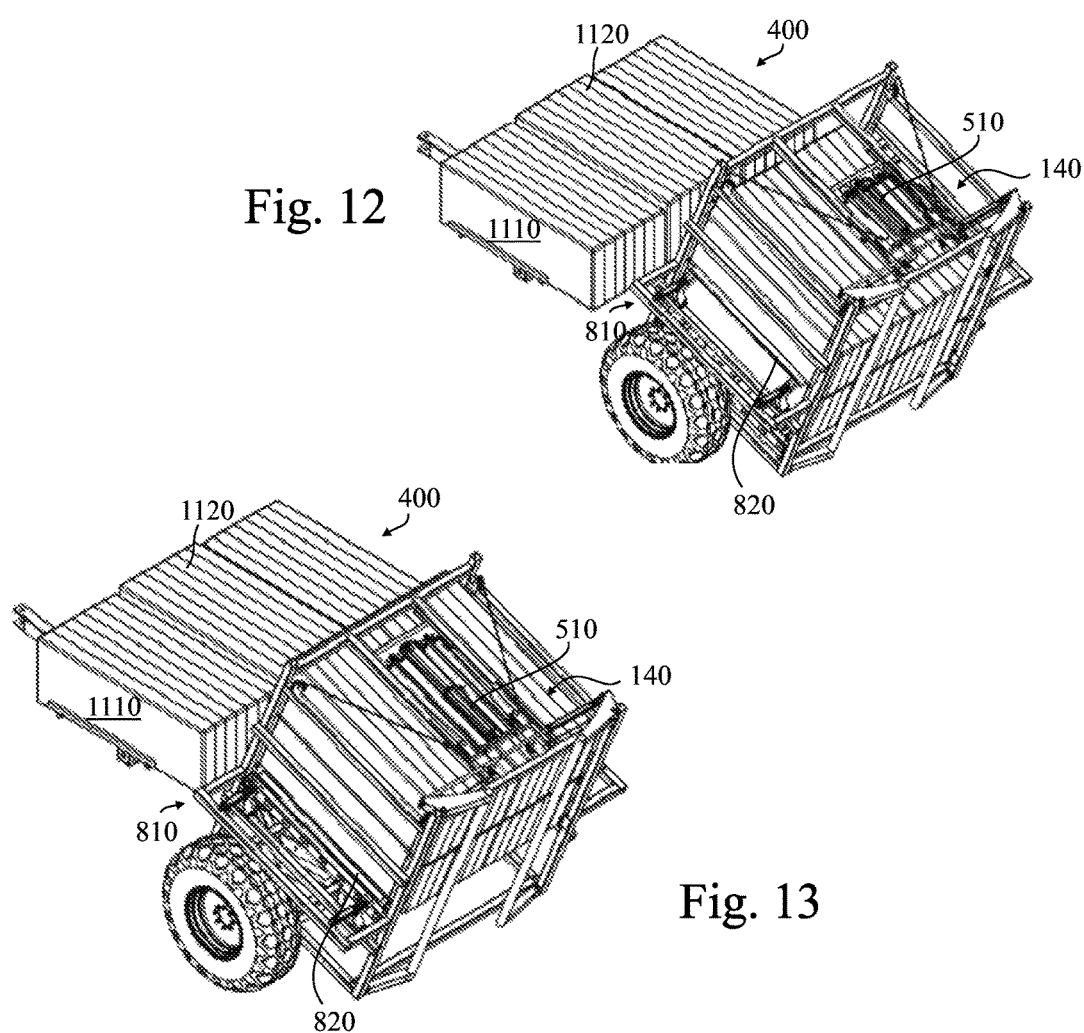
Fig. 12
Fig. 13

BALE STACKER

RELATED APPLICATIONS

This is a Divisional of U.S. patent application Ser. No. 14/795,250 filed Jul. 9, 2015 which claims priority from U.S. Provisional Patent No. 62/043,243, filed Aug. 28, 2014, both of which are hereby incorporated by reference in their entirety.

TECHNICAL FIELD

This invention relates generally to a device for delivering large square bales from an accumulator attached to a baler, moving the bales to a stacking machine to configure the bales into a stack at least two bales wide and at least two bales high.

BACKGROUND

U.S. Pat. No. 8,408,857 to a Bale Picking Truck by Kelderman shows a method and apparatus for quickly and efficiently picking up and removing biomass bales from a field in which the biomass was baled, compactly stacking the bales after picking the bales off the ground and efficiently depositing the bales on the ground at a staging area for later loading onto a semi trailer, straight truck, or train car, which application is incorporated herein by reference in its entirety.

Published U.S. Patent Application No. 2012/0045310 to a Bale De-Stacker by Kelderman relates to a method and apparatus for efficiently unstacking square bales from a stack and conveying the square bales in small sets or individually once they arrive from their aforementioned staging area to the place that they are to be used, such as in an ethanol production plant or a plant where the bales are to be burned for fuel.

Published U.S. Patent Application No. 2013/0315694 to Kelderman relates to a bale loading trailer and method of using it, specifically to loading and unloading stacks of six bales into or out of a trailer. U.S. patent application Ser. No. 14/326,149 to Kelderman shows a similar device to load or unload stacks of six bales into or out from a trailer that uses a center drive loader for a bale trailer. All the aforementioned patent documents are incorporated herein by reference in their entirety.

It is believed that a device for forming stacks of bales for use with the aforementioned equipment, a device to efficiently receive bales directly from a bale accumulator and form those bales into a stack of bales at least two bales wide and at least two bales high would be extremely useful but has heretofore never been contemplated or designed.

Accordingly, there is a need for a method and apparatus to efficiently load the bales directly from a baler accumulator to a bale stacker and form a stack at least two bales wide and at least two bales high.

SUMMARY OF THE INVENTION

Biomass is frequently formed into large bales of roughly rectangular parallelepiped shape. These are typically referred to by those having skill in this art as "large square bales," or "big square bales," and these terms will be used herein. Therefore, for the purposes of the instant document, including the claims, the synonymous terms, "large square bales," and "big square bales," are defined as bales of biomass, roughly shaped in rectangular parallelepiped shape. Typical large square bales run over 700 pounds and are bound with baling twine. The dimensions of these bales vary based on the needs of those involved in baling, storing, or feeding the bales. Although the present invention is not limited to a particular sized bale, ideal dimensions of the bale stacker of the present invention will be based on bale size.

Biomass is mowed in the fields in which it is grown, permitted to dry, windrowed, and baled. A bale accumulator associated with the baler may accept bales from the baler and organize them in a single layer, typically two or three bales wide.

The present invention is intended to trail behind the bale accumulator and accept bales from the bale accumulator. The bale stacker of the present invention creates a stack of a plurality of big square bales, convenient for loading onto another mode of conveyance. Multiple stacks may, for instance, be loaded onto the Bale Picking Truck of U.S. Pat. No. 8,408,857, or into the bale loading trailer of U.S. Published Patent Application No. 2013/0315694 or U.S. patent application Ser. No. 14/326,149.

An object of the present invention is to automatically create a stack of a plurality of large square bales.

Another object of this invention is to receive bales from bale accumulators accumulating bales either two or three bales wide.

DESCRIPTION OF THE DRAWINGS

The above mentioned need is at least partially solved through provision of the method and apparatus described in the following detailed description, particularly when studied in conjunction with the drawings, wherein:

FIGS. 4a through 4c show the bale stacker in plan view, and illustrate how bales from a bale accumulator, accumulating bales three-wide, are accommodated by pivoting the stacking mechanism relative to the tongue on a vertical axis of pivot;

FIG. 5 shows a perspective view of an empty bale stacker prepared to receive bales from a bale accumulator containing one layer of three bales;

FIG. 6 shows a perspective view of the bale stacker, having received two of three bales from the bale accumulator;

FIGS. 7 and 8 show perspective views of the bale stacker raising two bales;

FIGS. 11 through 13 illustrate a process of raising four bales;

Figure 1:
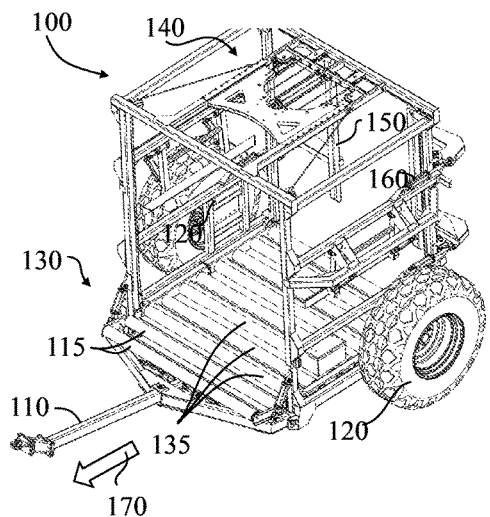
FIG. 1 shows the bale stacker of the present invention in perspective.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-23 show a preferred embodiment of the present invention.

Referring now to FIG. 1, the large square bale stacker 100 is shown in perspective view. The tongue 110 is used to draw the bale stacker 100 behind a baler equipped with a bale accumulator, as well as behind any source of motive power. A plurality of ground engaging wheels 120 support the stacker 100 and its load. A roller bed 130, having a plurality of rollers 135, provides a surface onto which large square bales 400 (see, for instance, FIG. 4a) are slid in organized fashion. Transition rollers 115 are attached to the tongue 110 and aid in transferring bales 400 into the bale stacker 100 irrespective of the tongue's 110 position. A cable lift mechanism 140 is used to raise bales 400 to make room for more bales 400 below. Gates 150, opened and closed by hydraulic cylinders 160, hold the bales 400 in place until an unloading operation is initiated.

The following terms are hereby defined for the purposes of this document, including the claims. An arrow 170 indicates a forward direction. This is the direction of travel when the bale stacker 100 is in use. Front is forward-most when the bale stacker 100 is pulled in its forward direction. Back or rear is opposite that of the front and behind is defined as in back of or rear of something. Left is defined as the left side when viewed from the rear, that is, when an observer is facing in the forward direction. Right is defined as the right side when viewed from the rear, that is, when an observer is facing in the forward direction. Up or upward is a direction opposing gravity, while down or downward is opposite that of up. In particular, the verb, raise, implies movement in the upward direction while the verb, lower, implies movement in the downward direction. All these terms all have their usual and customary meanings.

Figure 2A:
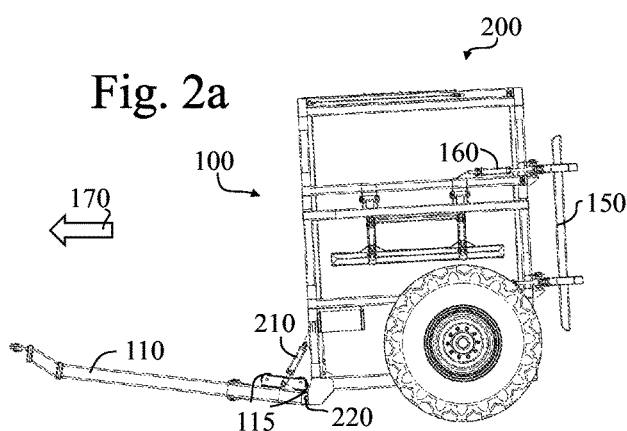
FIGS. 2a and 2b illustrate how the bale stacker mechanism pivots on a horizontal axis of pivot relative to a tongue.
Figure 2B:
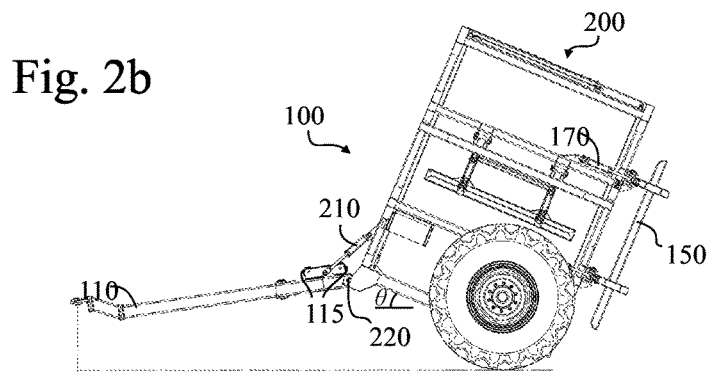

FIGS. 2a and 2b depict the adjustable angle, $\theta$, of the bale stacking mechanism 200. The bale stacking mechanism 200 is pivotable about a pin 220 defining a substantially horizontal axis 340 (see FIG. 3a) by virtue of the hydraulic cylinders 210. The adjustment of the angle, $\theta$, of the bale stacking mechanism 200 allows the bale stacker 100 to be pulled behind baler accumulators (not shown) of varying heights. By adjusting the angle, $\theta$, bales 400 may transition smoothly from the baler into the bale stacker 100.

Figure 3A:
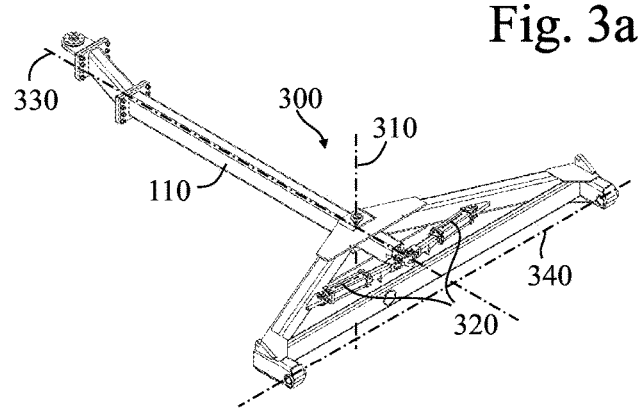
FIGS. 3a-3c illustrate a tongue of the bale stacker, and show a pivoting of the tongue on a vertical axis of pivot relative to the bale stacking mechanism.
Figure 3B:
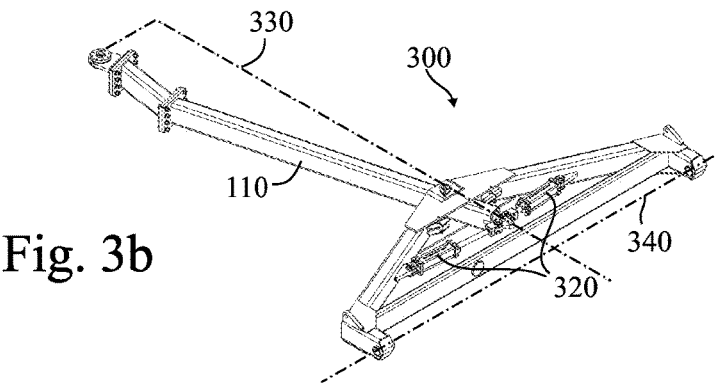
Figure 3C:
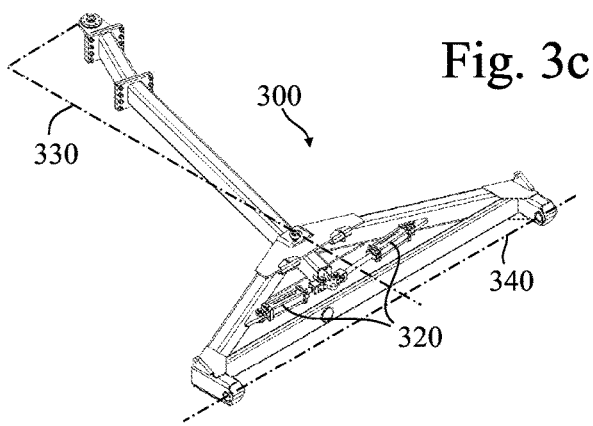

The frame 300 for the bale stacker 100 features an adjustable position tongue 110 as shown in FIGS. 3a-3c. The adjustable hitch makes it possible to pull the bale stacker 100 behind a baler utilizing either a two- or three-bale accumulator. This is because the bale stacker mechanism 200 may be laterally positioned directly behind any set—for instance, a pair—of bales 400 to be transferred from the bale accumulator to the bale stacker 100 as shown in FIGS. 4a-4c.

Lateral positioning is effected by pivoting the tongue 110 about a substantially vertical axis 310 through the actuation of a pair of hydraulic cylinders 320. Note that, here as well as elsewhere in this document, a hydraulic cylinder may be replaced by a pneumatic cylinder, linear electric actuator, screw actuator, etc. The present invention is not limited to hydraulic cylinders.

By actuating the cylinders 320, the tongue 110 is offset, angularly, from a longitudinal axis 330. The tongue 110 may be shifted left, as shown in FIG. 3b, or right, as shown in FIG. 3c, both from a perspective from the rear of the bale stacker 110.

The right and left offsets of the tongue 110 are greater than a minimum required to align with the bales 400 as they are received from the bale accumulator. This is so an operator can adjust how the bale stacker 100 trails the baler and the bale accumulator on a side-hill and when turning. Position sensors may be placed on the tongue 110 and programed to follow the motions of the baler to maintain optimal alignment with the bale accumulator.

In FIG. 4a, the tongue 110 of the bale stacker 100 is disposed symmetrically on the bale stacker 100 to be pulled directly behind a hitch on the baler (not shown). This provides the narrowest configuration for transport on roads, through gates, etc. In this configuration, none of the bales 400 can enter the bale stacking mechanism 200, directly. In FIG. 4b, the bale stacker 100 is shown aligned with a right-offset—that is, the tongue 110 has been shifted left—to permit two of the bales 410, 420 to enter the bale stacking mechanism 200. The bale stacker 100 can then be shifted, giving it a left-offset as shown in FIG. 4c. In this position, the bale stacking mechanism 200 is aligned to allow two more bales 430, 440 to enter it. Details of the bale accumulator are well known to those skilled in this art. A disclosure of a bale accumulator is provided by Branson in U.S. Pat. No. 5,829,238, hereby incorporated in its entirety by reference.

The first step in the bale stacking process is depicted in FIG. 5. The adjustable position tongue 110 is shifted right, aligning the bale stacking mechanism 200 with the two leftmost bales 430, 440 on the accumulator. The roller bed 130 is in its lowest position, as evidenced by a retracted hydraulic cylinder 510 in the cable lift mechanism 140. The bale stacking mechanism 200 has been angled back relative to the tongue 110. No bales 400 are present in the bale stacker 100.

FIG. 6 shows the bale stacker 100 receiving the two leftmost 430, 440 bales onto the roller bed 130 from the accumulator. The two bales 430, 440 are disposed in their lowest position in the bale stacker 100.

The hydraulic cylinder 510 is now extended in FIG. 7 indicating the cable lift mechanism 140 has raised the roller bed 130 and the two bales 430, 440 now residing on the roller bed 130. The first two bales 430, 440 are raised to make room for two more bales 400 beneath the first two bales 430, 440.

Figure 8:
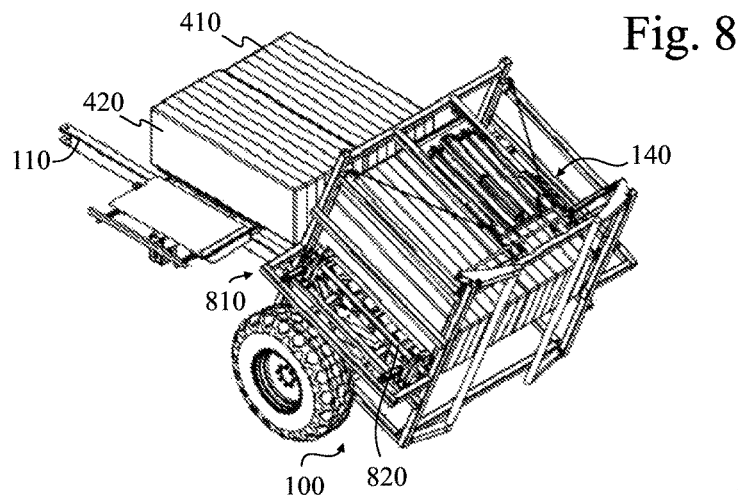

FIG. 8 depicts the bale grasping mechanism 810 gripping the now raised first bales 430, 440. The first bales 430, 440 are gripped between two bars or grippers 820. The adjustable position hitch 110 is shifted left aligning the bale stacker 100 with the two rightmost bales 410, 420 on the accumulator.

Figure 9:
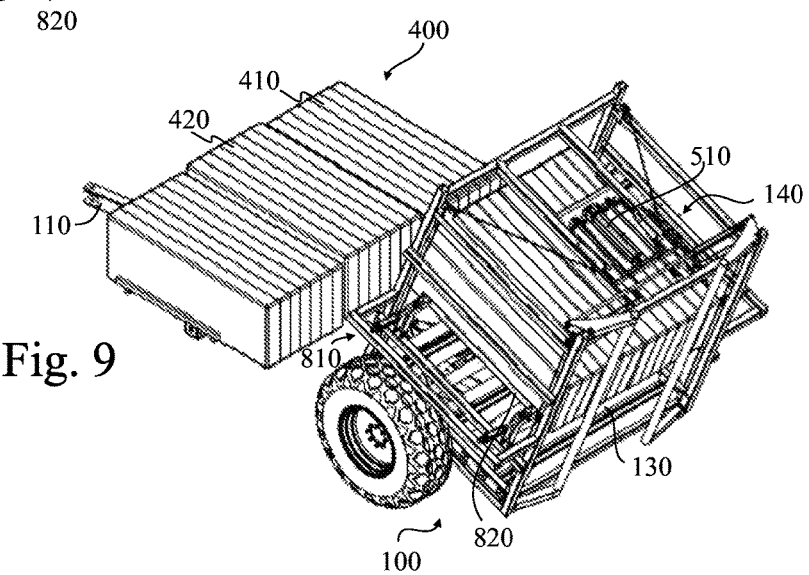
FIG. 9 shows a perspective view of the bale stacker prepared to receive two more bales from the bale accumulator, said two more bales to be disposed under two raised bales.

In FIG. 9, the cable lift mechanism 140 is shown returning the now empty roller bed 130 to its lowest position by retracting the hydraulic cylinder 510. Another bale 400 has been received on the bale accumulator.

Figure 10:
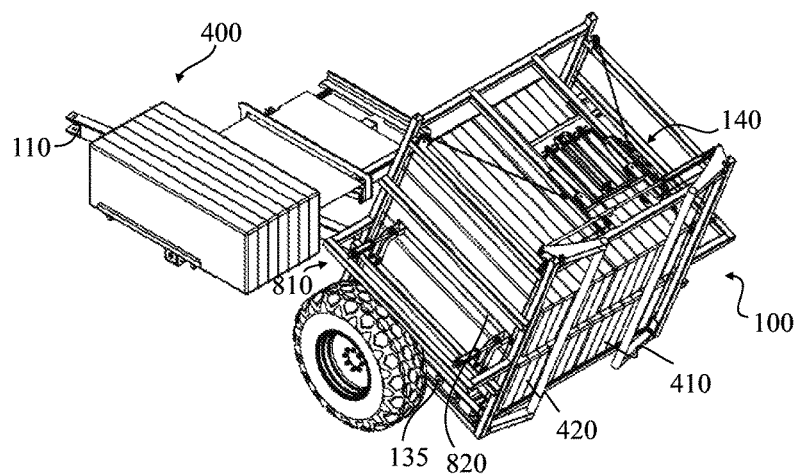
FIG. 10 shows a perspective view of the bale stacker having received two more bales from the bale accumulator, said two more bales to be disposed under two raised bales.

FIG. 10, the bale stacker 100 receives the two rightmost bales 410, 420 from the accumulator onto the roller bed 130. The second two bales 410, 420 presently reside beneath the first two bales 430, 440. A single bale 400 remains on the three-wide bale accumulator.

In FIGS. 11 and 12, the bale accumulator again fills, including the third two bales 1110, 1120.

FIG. 13 shows the cable lift mechanism 140 raising the roller bed 130 and the second two bales 410, 420 now residing on the roller bed 130 until the second two bales 410, 420 touch the underside of the first two bales 430, 440, being held by the bale grasping mechanism 810. The bale grasping mechanism 810 releases the first two bales 430, 440 in its grasp. The first two bales 430, 440 are now supported by the second two bales 410, 420, which continue to lift with the cable lift mechanism 140 and the extension of the hydraulic cylinder 510. The bale stack residing on the roller bed 130 now contains four bales 400, two wide by two high.

Figure 14:
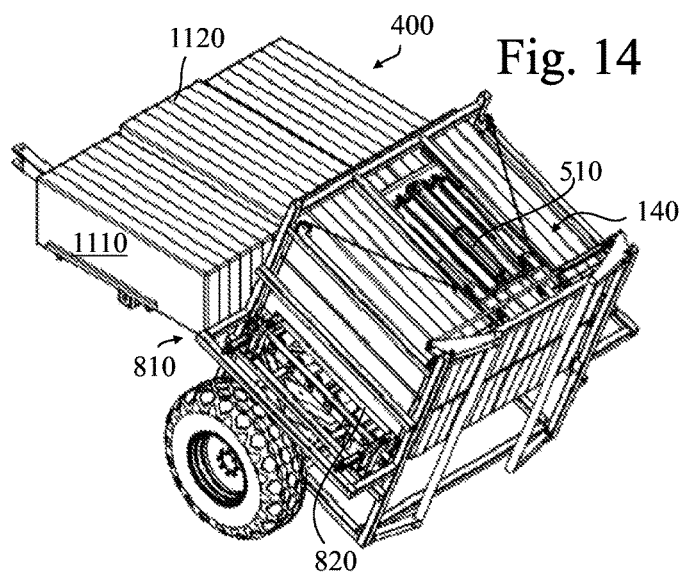
FIG. 14 shows a perspective view of the bale stacker with four bales at the top of their rise.

The bale grasping mechanism 810 now grips the second two bales 410, 420 in FIG. 14 to maintain the entire stack of bales 410, 420, 430, 440 in an elevated position, making room for additional bales 400 under the second two bales 410, 420.

Figure 15:
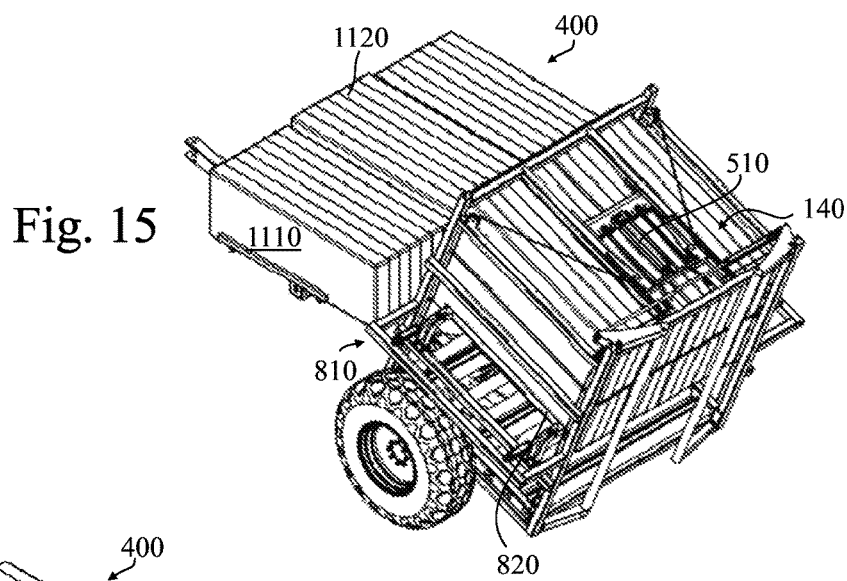
FIG. 15 shows a perspective view of the bale stacker with the four bales elevated and the roller bed being lowered to receive additional bales.
Figure 16:
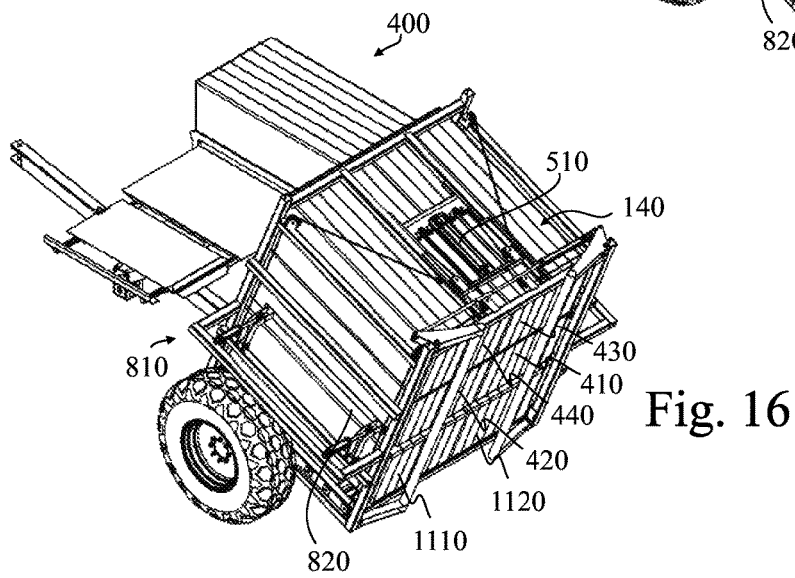
FIG. 16 shows a perspective view of the bale stacker, having received two additional bales on the roller bed.

The roller bed 130 has been returned to its lowest position in FIG. 15, preparing the bale stacker 100 to receive the third two bales 1110, 1120. The third two bales 1110, 1120 have been received into the bale stacker 100 in FIG. 16. This completes the stack for the stacker configuration shown in the figures.

Figure 17:
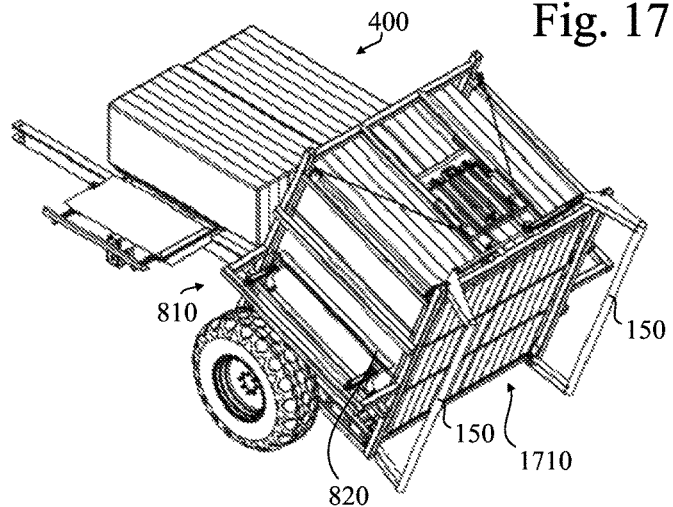
FIG. 17 shows a perspective view of the bale stacker with its rear gates open, preparing to unload its stack of six bales.
Figure 18:
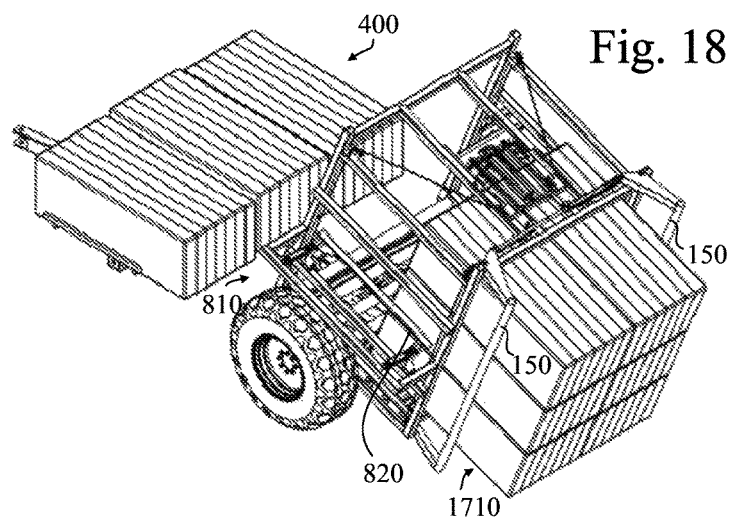
FIG. 18 shows a perspective view of the bale stacker unloading a stack of six bales.

The next step in the process is to prepare to eject the completed bale stack 1710 from the back of the bale stacker 100, as shown in FIG. 17. The hydraulic cylinders 160 for each of the two gates 150 are contracted to open the gates 150, at which time, the completed bale stack 1710 will eject, as shown in FIG. 18, under the force of gravity due to the tilt of the bale stacking mechanism 200. If the angle, θ, is insufficient at the time of the gate 150 opening, or if the bale stacker 100 is facing downhill, the angle, θ, may be increased by extending the hydraulic cylinders 210.

Figure 19:
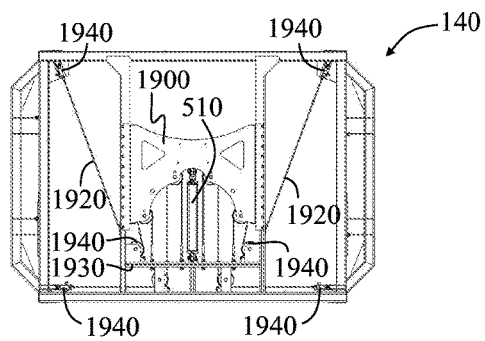
FIG. 19 is a top plan view of a cable lift mechanism, said mechanism having a roller floor at its lowest position.

FIG. 19 illustrates the cable lift mechanism 140 for the roller bed 130 in the down position. A slider 1900 is actuated by the hydraulic cylinder 510, which is retracted in this lowest roller bed 130 position. The fixed length cables 1920 are attached at one end to the roller bed 130 and at the other end to a stationary frame member 1930. Via a system of pulleys 1940, the cables are disposed downward at the corners of the bale stacker 100, as best seen in FIGS. 21 and 22.

Figure 20:
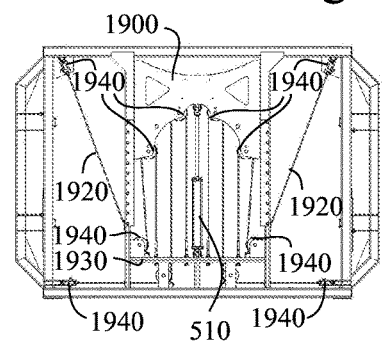
FIG. 20 is a top plan view of the cable lift mechanism, said mechanism having the roller floor at its highest position.

In FIG. 20, the cable lift mechanism 140 for the roller bed 130 is in its uppermost position. The roller bed 130 is raised as the hydraulic cylinder 510 extends, and the slider 1900 is pushed to its extreme forward position. Extending the cylinder 510 increases the distance between stationary frame member 1930 and the slider 1900. The fixed length cables 1920 move with the slider 1900 and raise the roller bed 130.

Figure 21:
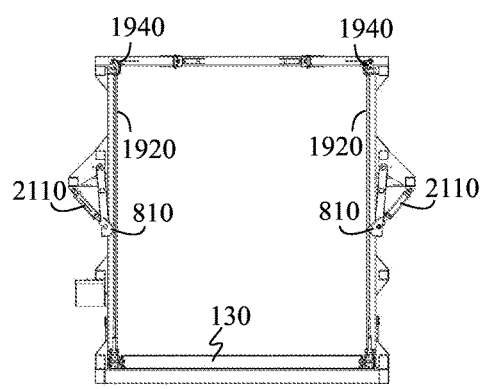
FIG. 21 is a rear elevation view of the apparatus of the present invention, detailing a gripping mechanism for grasping bales, said gripping mechanism is in its open condition.

FIG. 21 illustrates the bale grasping mechanism 810. In this figure, the bale grasping mechanism 810 is in its open position, that is, it is not gripping any bales in this position. Hydraulic cylinders 2110 are used to actuate the bale grasping mechanism 810. These hydraulic cylinders 2110 are, here, retracted so the bale grasping mechanism 810 is in its open position.

Figure 22:
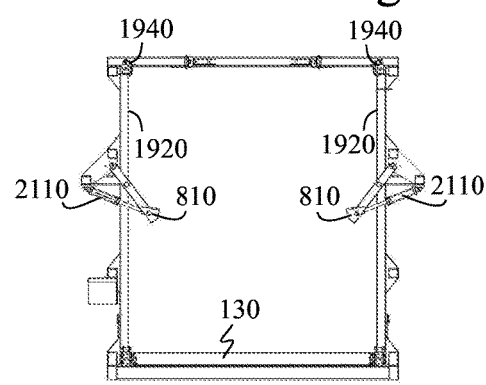
FIG. 22 is a rear elevation view of the apparatus of the present invention, showing the gripping mechanism in its closed condition, whereby bales are grasped.

In FIG. 22, the bale grasping mechanism 810 is shown in rear elevation in its closed position. In the closed position, the hydraulic cylinders 2110 are extended and a set of bales 400 may be gripped.

Figure 23:
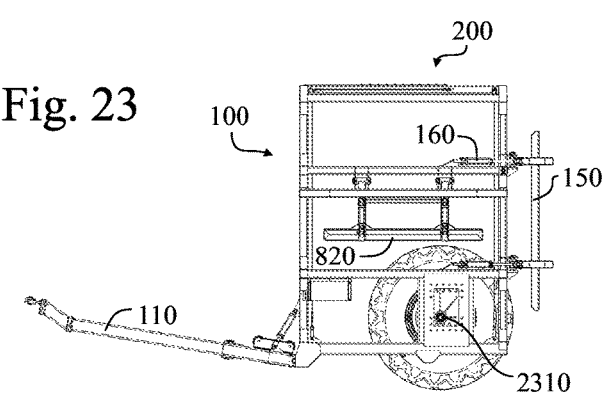
FIG. 23 is a side elevation view of the bale stacker showing an adjustable spindle.

The tongue weight may be adjusted by repositioning an adjustable spindle 2310, shown in FIG. 23. The spindle is operatively affixed to a large plate with multiple adjustment holes, permitting the spindle to be disposed in more forward or more rearward positions to alter the balance of the bale stacker 100.

All functions of the bale stacker 100 of the present invention may be automated using feedback from position sensors and a Controller Area Network (CAN) bus system. This will free up the baler operator to concentrate on controlling the baler functions.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

The invention claimed is:
1. An apparatus for forming stacks of large square bales, the apparatus comprising a bale stacker mechanism drawn in a generally forward direction parallel to a longitudinal axis, said bale stacker mechanism comprising:
    (a) a roller bed on which to dispose the large square bales;
    (b) a lift system to raise the roller bed from a first elevation to a greater, second elevation;
    (c) a bale grasping mechanism by which to grip the large square bales when said roller bed is disposed at the second elevation;
    (d) at least one ground engaging wheel to provide support for the apparatus for forming stacks of large square bales;
    (e) an axis of rotation about which said at least one ground engaging wheel rotates;
    (f) a tongue by which the bale stacker mechanism may be drawn behind a baler;
    (g) a pivotal axis disposed perpendicularly to a plane disposed parallel to both the longitudinal axis and the axis of rotation, said tongue being operatively, pivotally attached to the bale stacking mechanism on said pivotal axis which permits a variable angle between the tongue and the longitudinal axis; and

(h) wherein the pivotal axis comprises a first pivotal axis, the variable angle comprises a variable first angle, and the plane comprises a first plane, the apparatus additionally comprising:
  a second plane in which the roller bed is disposed; and
  a second pivotal axis disposed orthogonal to both the longitudinal axis and the first pivotal axis, the tongue being operatively, pivotally attached to the bale stacker mechanism on said second pivotal axis and permitting a second variable angle between.

2. The apparatus of claim 1 additionally comprising at least one actuator by which the tongue may be rotated about the pivotal axis.

3. The apparatus of claim 1 additionally comprising at least one actuator by which the tongue may be rotated about the second pivotal axis.

4. The apparatus of claim 1 wherein the roller bed comprises a plurality of rollers having axes of rotation parallel to one another and perpendicular to the forward direction of the apparatus for forming stacks of large square bales.

5. The apparatus of claim 1 wherein the lift system comprises:
  (a) at least one cable, a first end of which is operatively attached to the roller bed;
  (b) at least one pulley to which the at least one cable is engaged; and
  (c) at least one actuator disposed such that, when the at least one actuator is actuated, the at least one cable is drawn thus altering an elevation of the roller bed.

6. The apparatus of claim 5 additionally comprising a slider to which the at least one actuator is operatively attached and by which a motion of the at least one cable is effected.

7. The apparatus of claim 1 wherein the bale grasping mechanism comprises:
  (a) at least one actuator; and
  (b) at least one gripper, operatively connected to the at least one actuator, and operatively moved by the at least one actuator.

8. The apparatus of claim 1, additionally comprising:
  (a) at least one gate through which a bale stack may be ejected from the apparatus for forming stacks of large square bales; and
  (b) at least one actuator to effect an opening and closing of said at least one gate.

9. The apparatus of claim 1, additionally comprising:
  (a) a spindle to which ground engaging wheels are operatively, rotatably attached on the axis of rotation; and
  (b) an adjustment mechanism by which said spindle may be adjusted forward and aft to change a tongue weight.

10. An apparatus for forming stacks of large square bales, the apparatus comprising a bale stacker mechanism drawn generally parallel to a longitudinal axis in a forward direction, said bale stacker mechanism comprising:
  (a) a roller bed on which to dispose the large square bales, said roller bed residing in a first plane;
  (b) a lift system to raise the roller bed from a first elevation to a greater second elevation;
  (c) a bale grasping mechanism by which to grip the large square bales when said roller bed is disposed at the second elevation;
  (d) a tongue by which the bale stacker mechanism may be drawn behind a baler, said tongue residing in a second plane; and
  (e) a first pivot comprising a first axis residing in both the first and second planes by which the tongue is operatively pivotally attached to the bale stacker mechanism and permitting a variable first angle between the first and second planes; and
  (f) a second pivot comprising a second axis disposed orthogonal to both the longitudinal axis and the first axis, said second pivot by which the tongue is operatively pivotally attached to the bale stacker mechanism and permitting a variable second angle between the tongue and the longitudinal axis, the tongue residing in the second plane, continuously.

11. The apparatus of claim 10 additionally comprising:
  (a) ground engaging wheels to support the bale stacking mechanism;
  (b) a third axis about which said ground engaging wheels rotate, wherein the first axis is substantially parallel to the third axis.

12. The apparatus of claim 10 additionally comprising at least one actuator by which the first angle between the first and second planes may be varied.

13. The apparatus of claim 10 additionally comprising at least one actuator by which the second angle between the tongue and the longitudinal axis may be varied.

14. The apparatus of claim 10 wherein the roller bed comprises a plurality of rollers having axes of rotation parallel to one another and perpendicular to the forward direction of the apparatus for forming stacks of large square bales.

15. The apparatus of claim 10 wherein the lift system comprises:
  (a) at least one cable, a first end of which is operatively attached to the roller bed;
  (b) at least one pulley to which the at least one cable is engaged; and
  (c) at least one actuator disposed such that, when the at least one actuator is actuated, the at least one cable is drawn thus altering an elevation of the roller bed.

16. The apparatus of claim 15 additionally comprising a slider to which the at least one actuator is operatively attached and by which a motion of the at least one cable is effected.

17. The apparatus of claim 10, additionally comprising:
  (a) at least one gate through which a bale stack may be ejected from the apparatus for forming stacks of large square bales; and
  (b) at least one actuator to effect an opening and closing of said at least one gate.

18. The apparatus of claim 10, additionally comprising:
  (a) a spindle to which ground engaging wheels are operatively, rotatably attached; and
  (b) an adjustment mechanism by which said spindle may be adjusted forward and aft to change a tongue weight.

* * * * *